(12) United States Patent
Darwin (10) Patent No.: US 9,639,862 B2
(45) Date of Patent: May 2, 2017

(54) TRACKING THE INFLUENCE OF GIFT GIVING WITHIN A SOCIAL NETWORK

(71) Applicant: Facebook, Inc., Menlo Park, CA (US)

(72) Inventor: Zackary Daniel Darwin, Austin, TX (US)

(73) Assignee: FACEBOOK, INC., Menlo Park, CA (US)

( * ) Notice: Subject to any disclaimer, the term of this patent is extended or adjusted under 35 U.S.C. 154(b) by 206 days.

(21) Appl. No.: 14/294,793

(22) Filed: Jun. 3, 2014

(65) Prior Publication Data

US 2015/0348123 A1 Dec. 3, 2015

(51) Int. Cl.
*G06Q 30/00* (2012.01)
*G06Q 99/00* (2006.01)
*G06Q 30/02* (2012.01)
*G06Q 30/06* (2012.01)
*G06Q 50/00* (2012.01)

(52) U.S. Cl.
CPC ..... *G06Q 30/0269* (2013.01); *G06Q 30/0633* (2013.01); *G06Q 50/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,438,062 B2 * | 5/2013 | Rohan | ................. | G06Q 30/02 705/14.49 |
| 8,499,247 B2 * | 7/2013 | Niyogi | ................. | G06Q 10/00 705/14.4 |
| 8,706,647 B2 * | 4/2014 | Pathak | ............... | G06Q 30/0201 705/319 |
| 8,930,966 B2 * | 1/2015 | Ranjan | ............. | G06F 17/30345 705/319 |
| 2002/0107756 A1 * | 8/2002 | Hammons | ............... | G06Q 30/02 705/26.3 |
| 2002/0143777 A1 * | 10/2002 | Whelan | .................. | G06Q 30/02 |
| 2008/0040673 A1 * | 2/2008 | Zuckerberg | ....... | G06F 17/30867 715/745 |
| 2008/0147482 A1 * | 6/2008 | Messing | ................ | G06Q 30/02 705/14.53 |
| 2008/0189189 A1 * | 8/2008 | Morgenstern | .......... | G06Q 30/02 705/12 |
| 2009/0204528 A1 * | 8/2009 | Moses | .................... | G06Q 40/00 705/35 |
| 2009/0254859 A1 * | 10/2009 | Arrasvuori | ............. | G06Q 10/10 715/810 |

(Continued)

*Primary Examiner* — Matthew T Sittner
(74) *Attorney, Agent, or Firm* — Nicholson De Vos Webster & Elliott LLP (57) ABSTRACT

Exemplary methods, apparatuses, and systems receive a gift giving event characteristic. A first set of one or more gift giving events within a first period of time that meet the received gift giving event characteristic are identified. Each of the gift giving events result in a narrative being published to a social network and are viewable by a group of one or more users of the social network. A second set of one or more gift giving events within a second period of time are identified. The second period of time is subsequent to the first period time. The second set of gift giving events are initiated by the group of one or more users. An amount of influence of a first user that initiated a gift giving event in the first set of gift giving events is determined based upon the second set of gift giving events.

20 Claims, 7 Drawing Sheets

(56) References Cited

U.S. PATENT DOCUMENTS

| | | | | |
|---|---|---|---|---|
| 2010/0023341 A1* | 1/2010 | Ledbetter | ............... | G06Q 10/10 705/1.1 |
| 2010/0153185 A1* | 6/2010 | Ghosh | ................... | G06Q 10/04 705/7.11 |
| 2011/0166956 A1* | 7/2011 | Jacobi | ............... | G06F 17/30867 705/26.8 |
| 2011/0231239 A1* | 9/2011 | Burt | ........................ | G06Q 30/02 705/14.41 |
| 2011/0320250 A1* | 12/2011 | Gemmell | ............... | G06Q 30/02 705/14.16 |
| 2012/0095932 A1* | 4/2012 | Panyam | ................. | G06Q 50/01 705/319 |
| 2012/0096151 A1* | 4/2012 | Chernaik | ............... | G06Q 10/10 709/224 |
| 2012/0150732 A1* | 6/2012 | Isaacson | ............... | G06Q 10/101 705/39 |
| 2012/0158455 A1* | 6/2012 | Pathak | ............... | G06Q 30/0201 705/7.29 |
| 2013/0006709 A1* | 1/2013 | Kosta | ................. | G07F 17/3206 705/7.29 |
| 2013/0096981 A1* | 4/2013 | Evans | ................ | G06Q 30/0201 705/7.29 |
| 2013/0117151 A1* | 5/2013 | Macaisa | ................ | G06Q 50/01 705/26.8 |
| 2013/0211954 A1* | 8/2013 | Linden | ............... | G06Q 30/0621 705/26.8 |
| 2013/0275514 A1* | 10/2013 | Tanaka | ................... | G06Q 30/02 709/204 |
| 2013/0304522 A1* | 11/2013 | Cundle | .................. | G06Q 10/02 705/5 |
| 2014/0067671 A1* | 3/2014 | DeHaven | ............... | G06Q 20/28 705/44 |
| 2014/0257921 A1* | 9/2014 | Bear | ................... | G06Q 30/0269 705/7.29 |
| 2014/0315639 A1* | 10/2014 | Cao | ......................... | A63F 13/12 463/31 |
| 2015/0134416 A1* | 5/2015 | Modani | ................... | G06Q 50/01 705/7.33 |
| 2015/0149373 A1* | 5/2015 | Chhaya | ................... | G06Q 50/01 705/319 |
| 2015/0348123 A1* | 12/2015 | Darwin | ............... | G06Q 30/0269 705/14.66 |

* cited by examiner

TRACKING THE INFLUENCE OF GIFT GIVING WITHIN A SOCIAL NETWORK

FIELD

The various embodiments described herein relate to tracking the influence of gift giving events within social networking systems. In particular, embodiments relate to tracking gift giving by users within a period of time following a gift giving event being published for the users to view within the social network.

BACKGROUND

Social networking systems enable users to interact with various objects represented within the social network. For example, a social networking system allows users to designate other users or entities as connections (or otherwise connect to, or form relationships with, other users or entities), contribute and interact with their connections, post media or commentary, share links to external content, use applications, join groups, list and confirm attendance at events, invite connections, and perform other tasks that facilitate social interaction. External applications also use the services of a social networking system to allow authenticated users to incorporate some of the above social interactions with use of the external applications. Similar interactions may also be a part of the user experience within other network services.

For example, users of a social networking system are able to utilize the social networking system to give gifts to one another. Through a series of commands in a user interface within the social networking system, a first user may select a second user to receive a gift, select a gift, add a personal message, and complete the transaction. In response, the social networking system facilitates the transaction with the corresponding merchant and publishes a narrative of the gift giving for one or more users to view. The narrative may be visible to the recipient of the gift. Alternatively, the narrative may be published publicly or such that connections of the giver and/or receiver of the gift are able to view the narrative.

SUMMARY OF THE DESCRIPTION

Exemplary methods, apparatuses, and systems receive one or more gift giving event characteristics and/or a time interval to use in determining how influential one or more gift giving events were within a social network. A first set of one or more gift giving events within a first period of time that meet the received gift giving event characteristic are identified. In one embodiment, gift giving event characteristics describe the gifts and/or the users giving gifts. For example, the received characteristic(s) may seek to identify users of a particular geographic region, gender, age or other group affiliation, or that give a particular number of gifts, gifts of a minimum value, gifts from a particular business, etc. In one embodiment, the identification of each user or gift meeting such characteristic(s) results in the creation of a graph or other data structure entry including the user giving the gift, the characteristic(s) of or other data about the gift, and the recipient of the gift.

Each of the gift giving events result in a narrative being published to a social network and are viewable by a group of one or more users of the social network. For example, each user that initiated a gift giving event identified in the first set, and the corresponding recipient user, may have or otherwise be subject to a privacy setting indicating which users of the social network are able to view the published narrative. In one embodiment, only direct connections (or "friends") of the giver and/or receiver are able to view the published narrative. In alternate embodiments, the published narrative is publicly viewable, limited to only the giver and receiver, etc.

A second set of one or more gift giving events within a second period of time are identified. The second period of time is subsequent to the first period time and the second set of gift giving events are initiated by the group of one or more users that were able to view the published narrative(s) of the first set of gift giving events. In one embodiment, additional sets of gift giving events are identified within subsequent time periods until no additional gift giving events are identified as being initiated by a user that was able to view the published narrative(s) of the gift giving event(s) of the last time period. For example, another set of users that were able to view the gift giving events of the second set may, in turn, initiate gift giving events in a third time period, and so on.

An amount of influence of a first user that initiated one or more gift giving events in the first set of gift giving events is determined based upon the second set of gift giving events and, if applicable, subsequent sets of gift giving events. In one embodiment, the amount of influence includes a value of the identified gifts in the second set of gift giving events and given by one or more users that were able to view the narrative of the first user's gift giving event(s). In another embodiment, the amount of influence includes a number of identified gifts given by a second user in the second period time, the second user being within the group of one or more users able to view the narrative of the gift giving event(s) initiated by the first user. In yet another embodiment, the amount of influence includes a number of users that initiated gift giving events in the second period time that were able to view the narrative of the gift giving event initiated by the first user.

In one embodiment, the first user is targeted for advertisements or gift giving narratives of other users based upon the determined amount of influence. For example, if the first user's gift giving resulted in a particular number, value, or type of gifts being given in a chain of gift giving events by users in each subsequent time period, the user is presented with advertising or gift giving narratives that may result in the first user initiating another gift giving event or chain of gift giving events.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein track gift giving events initiated by social networking users within a period of time following a gift giving event being published for those users to view within the social network. For example, embodiments may create a directed graph or other data structure to identify the potential viral influence of gift giving events between users within the social network. As a result, users that have been determined to have an estimated level of influence may be targeted for receiving narratives of other gift giving events or advertising or other prompting to encourage giving a gift. This targeting enables the social networking system to encourage gift giving among users that are likely to give a gift or influence others to give a gift while avoiding presenting these types of messages to users that are not likely to give a gift or to influence others to give a gift. Targeted messages are more likely to result in additional gifts being given while minimizing the use of messages that may otherwise be a distraction from the user experience.

In the following description, numerous specific details are set forth. However, it is understood that embodiments of the invention may be practiced without these specific details. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Additionally, as used herein, the term "exemplary" refers to embodiments that serve simply as an example or illustration. Furthermore, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
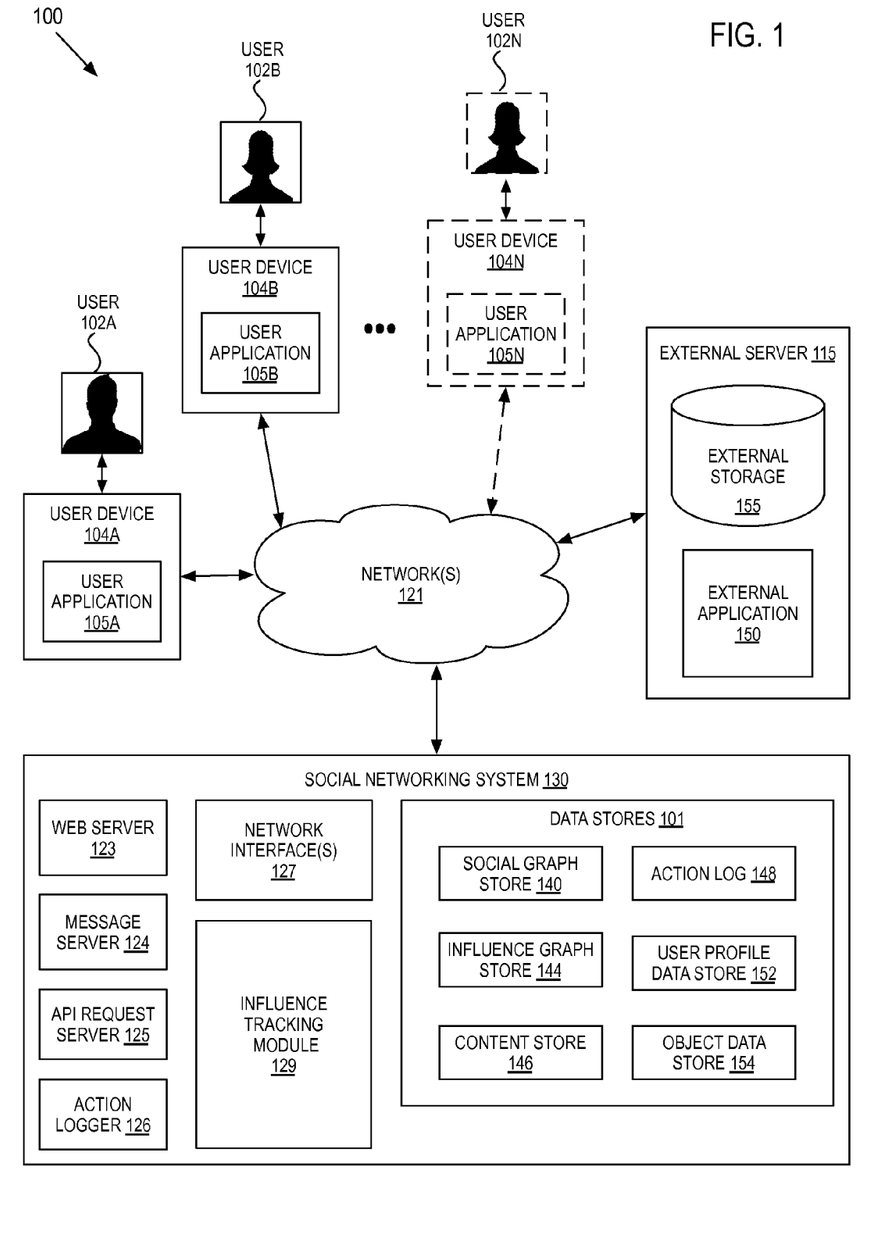
FIG. 1 illustrates an exemplary network environment of a system, including a social networking system, to track the influence of gift giving or other events within a social network.

FIG. 1 illustrates an exemplary network environment of a system 100 including a social networking system 130 that offers users 102A-102N the ability to communicate and interact with other users 102A-102N and entities of the social networking system 130 according to an embodiment of the invention. The user devices 104A-104N are enabled to interact with social networking system 130 and can be any type of computing device capable of receiving user input as well as transmitting and/or receiving data via a network (e.g., network(s) 121). Exemplary user devices 104A-104N include conventional computer systems, such as a desktop or laptop computer, or may include devices having computer functionalities such as Personal Digital Assistants (PDA), cellular or mobile telephones, smart-phones, in- or out-of-car navigation systems, gaming devices, or other electronic devices.

In one embodiment, a user device (e.g. 104A) may execute a user application (e.g. 105A) allowing a user 102A of the user device 104A to interact with the social networking system 130. For example, the user application 105A may be a web browser application. In an embodiment, the user application 105A is a special-purpose client application (e.g., Facebook for iPhone or iPad, etc.), and in an embodiment the user application 105A is the native operating system of the user device 104A, such as Windows®, Mac OSX®, iOS®, or ANDROID™ which may utilize an Application Programming Interface (API) to directly interface with the social networking system 130 through API request server 125.

The user devices 104A-104N are configured to communicate with the social networking system 130 via a network 121 or collection of networks, such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 121 may be wired, wireless, or a combination of both. In one embodiment, the network 121 uses standard communications technologies and/or protocols.

In some embodiments, the social networking system 130 comprises one or more computing devices storing user profiles associated with users 102A-102N and/or other objects, as well as connections between users and other users 102A-102N and/or objects. Users 102A-102N, using the social networking system 130, may add connections to other users or objects of the social networking system 130 to which they desire to be connected, and may also interact with these other users or objects. The users of the social networking system 130 are individuals (e.g. humans), and the objects may include entities (such as businesses, organizations, universities, manufacturers, brands, celebrities, etc.), concepts, or other non-human things including but not limited to a location, an album, an article, a book, a movie, food, etc.

Based on the stored data about users, objects, and the connections between the users and/or objects, the social networking system 130 generates and maintains a "social graph" in a social graph store 140 comprising a plurality of nodes interconnected by a plurality of edges. Each node in the social graph represents a user or object that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 130 adds, removes, or otherwise modifies edges connecting the various nodes to reflect the interactions. An exemplary social graph is described with reference to FIG. 2.

To provide these functionalities, one embodiment of the social networking system 130 includes an API request server 125, a web server 123, a message server 124, an action logger 126, and a set of data stores 101. This embodiment also includes, within the data stores 101, a social graph store 140, an influence graph store 144, a content store 146, an action log 148, a user profile data store 152, and an object data store 154. In other embodiments, the social networking system 130 may include additional, fewer, or different modules for various applications. Of course, conventional components such as processors, memories, security mechanisms, load balancers, failover servers, management and network operations consoles, and the like are not shown in FIG. 1 so as to not obscure the details of the system.

The social networking system 130 allows its users 102A-102N to communicate or otherwise interact with each other and access content, as described herein. The social networking system 130 stores user profiles in the user profile data store 152. A user profile includes declarative information about the user that was explicitly shared by the user, and may also include profile information inferred by the social networking system 130. In one embodiment, a user profile includes multiple data fields, each data field describing one or more attributes of the corresponding user of the social networking system 130. The user profile information stored in user profile data store 152 describes the users 102A-102N of the social networking system 130, including biographic, demographic, and other types of descriptive information, such as work experience, educational history, gender, relationship status, hobbies, location, other preferences, and the like. The user profile may also store information provided by the user. For example, images, videos, and location data provided by the user may also be stored within the user profile. In other embodiments, only textual data of the user is stored in the user profile and other data (e.g., images, videos, etc.) are stored in multimedia stores and associated with the user (e.g., through associating a user identifier of the user with an image/video identifier of the multimedia content). In certain embodiments, images, videos, and posts by users including or depicting one or more other users of the social networking system 130 may be "tagged" with identification information of those users. A user profile in the user profile data store 152 may also maintain references to actions (stored in the user profile or in an action log 148) by the corresponding user performed on content items in a content store 146. A user may also specify one or more privacy settings, which are stored in that user's user profile. Privacy settings limit information that the social networking system 130 or other users of the social networking system 130 are permitted to access from that user's user profile.

The web server 123 links the social networking system 130 via the network 121 to one or more user devices 104A-104N by accepting requests for from the user devices 104A-104N and/or transmitting webpages or other web-related content to the user devices 104A-104N, such as image files, audio files, video files, Java applets, Flash, XML, JavaScript, Cascading Style Sheets (CSS), and so forth. The web server 123 in some embodiments is configured to utilize a set of one or more network interfaces 127 to send and receive messages across the network 121. In some embodiments the web server 123 (additionally or alternately) utilizes a message server 124 (e.g., a dedicated server end station, a dedicated software application, etc.) to communicate with the user devices 104A-104N, which is operative to send and/or receive instant messages, queued messages (e.g., email), text and SMS (Short Message Service) messages, or utilize any other suitable messaging technique.

In some embodiments, a message sent by a user to another user by way of the social networking system 130 can be viewed by other users of the social networking system 130, for example, by certain connections of the user (directly connected users in the social graph, other users more than one hop away in the social graph, etc.) receiving the message. An example of a type of message that can be viewed by other users of the social networking system 130 (besides the recipient of the message) is commonly known as a "post." In some embodiments, a user can send a private message to another user that can only be retrieved by the other user.

When a user takes an action within the social networking system 130, an action logger 126, subject to any privacy settings and restrictions of the user and/or social networking system 130, may record the action in an action log 148. In one embodiment, the social networking system 130 maintains the action log 148 as a database of entries. When an action is taken on the social networking system 130, the social networking system 130 can add an entry for that action to the action log 148. In accordance with various embodiments, the action logger 126 is capable of receiving communications from the web server 123 about user actions on and/or off the social networking system 130. The action logger 126 populates the action log 148 with information about those user actions. This information may be subject to privacy settings associated with the user. Any action that a particular user takes with respect to another user is associated with each user's profile, through information maintained in a database or other data repository, such as the action log 148. Examples of actions taken in the social networking system 130 that may be stored in the action log 148 include, but are not limited to, adding a connection to another other user, sending a message to the other user, reading a message from the other user, viewing content (e.g., posts, images, videos) associated with or created by the other user, attending an event posted by another user, being tagged in posts or photos with/by another user, giving a gift to another user, etc. As used herein, giving a gift or "initiating a gift giving event" refers to a user initiating an online transaction to give a gift to another user, e.g., by selecting a gift and a recipient and providing authorization to pay for the gift. In some embodiments, actions like gift giving events are described in connection with more than one user, and these actions may be associated with those users and stored in the action log 148.

Users may interact with various objects on the social networking system 130, including viewing posts, commenting on posts, sharing links, checking-in to physical locations via a mobile device, and other interactions. Information describing these actions is stored in the action log 148. Additional examples of interactions with objects on the social networking system 130 included in the action log 148 include logging in to the social networking system 130, commenting on a photo album, communications between users, becoming a fan of a musician or brand by "liking" a page of the respective entity, adding an event to a calendar, joining a group, creating an event, authorizing an application, using an application, and engaging in a transaction. Additionally, the action log 148 records a user's interactions with advertisements on the social networking system 130 as well as other applications operating on the social networking system 130. In some embodiments, data from the action log 148 is used to infer interests or preferences of the user, augmenting the interests included in the user profile and allowing a more complete understanding of user preferences.

The action log 148 may be used by the social networking system 130 to track other user actions on the social networking system 130, as well as actions on an external application 150 (e.g., website) that are communicated to the social networking system 130. For example, the social networking system 130 may allow users to interact with external (e.g., third-party) applications 150 (e.g., websites), external storage 155, and/or external servers 115 (e.g., server end stations). The API request server 125 allows external systems (e.g., an external application 150 of external server 115, and/or user applications 105A of user devices 104A-104N) to access information from or transmit information to the social networking system 130 by issuing API calls. The information provided by the social networking system 130 may include user profile information or the connection information of users, subject to the individual privacy settings of the user. For example, a system (e.g. external application 150) may send an API request to the social networking system 130 via the network 121 to publish a story, such as a narrative of a gift giving event, on behalf of a user, request information about a user (after having been given permission to do so by the user), upload a photograph on behalf of a user, etc. API requests are received at the social networking system 130 by the API request server 125, which then processes the request by performing actions sought by the API requests, determining appropriate responses to the API requests, and transmitting back these responses back to the requesting application 150 via the network 121.

The content store 146 stores content items associated with user profiles, such as images, videos, and/or audio files. Content items from the content store 146 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users or entities, to invite new users to the system or to increase interaction with the social network system 130 by displaying content related to users, objects, activities, or functionalities of the social networking system 130. Examples of social networking content items include suggested connections or suggestions to perform other actions, media provided to or maintained by the social networking system 130 (e.g., pictures, videos), status messages or links posted by users to the social networking system, events, groups, pages (e.g., representing an organization or commercial entity), and any other content provided by, or accessible via, the social networking system 130.

The content store 146 also includes one or more pages associated with entities included social graph store 140. An entity is a type of object that can be a non-individual user of the social networking system 130, such as a business, a vendor, an organization, or a university. However, in some embodiments of the invention, an entity may represent a celebrity or other well-known individual, and thus an entity object node for a person may exist in the social graph (serving as a "brand" for that individual, and perhaps having an associated page that other users may "like") and also a user node for that same person may also exist in the social graph (serving as a representation for a personal account of that person). A page includes content associated with an entity and instructions for presenting the content to a user of the social networking system 130. For example, a page identifies content associated with the entity's stored content (from the object data store 154) as well as information describing how to present the content to users viewing the page.

In the depicted embodiment, social networking system 130 includes an influence tracking module 129. In an alternate embodiment, the influence tracking module 129 is a part of the external server 115. For example, the influence tracking module 129 may be implemented by the external application 150. The influence tracking module 129 tracks the influence or viral nature of actions performed by users of the social network. In one embodiment, the influence tracking module 129 determines the influence or viral nature of gift giving events as described in greater detail with respect to FIGS. 2-6. For example, the influence tracking module 129 receives a gift giving event characteristic and identifies a first set of one or more gift giving events within a first period of time that meet the received gift giving event characteristic. Each of the identified gift giving events results in a narrative being published to a social network and viewable by a group of one or more users of the social network. In one embodiment, the influence tracking module 129 creates a directed graph or other data structure to store, in the influence graph store 144, representations of the user giving a gift, the user receiving the gift, and information about the gift. The influence tracking module 129 identifies one or more subsequent sets of gift giving events within subsequent period(s) of time. The subsequent set(s) of gift giving events being initiated by the group of one or more users able to view narratives of the gifts given in the previous period of time. The influence tracking module 129 adds each set of gift giving events to the influence graph store 144. As described in greater detail below, the influence tracking module 129 uses the data in the influence graph store 144 to determine an amount of influence of a first user that initiated a gift giving event from the first set of gift giving events. In one embodiment, the amount of influence is based upon the second set of gift giving events.

Figure 2:
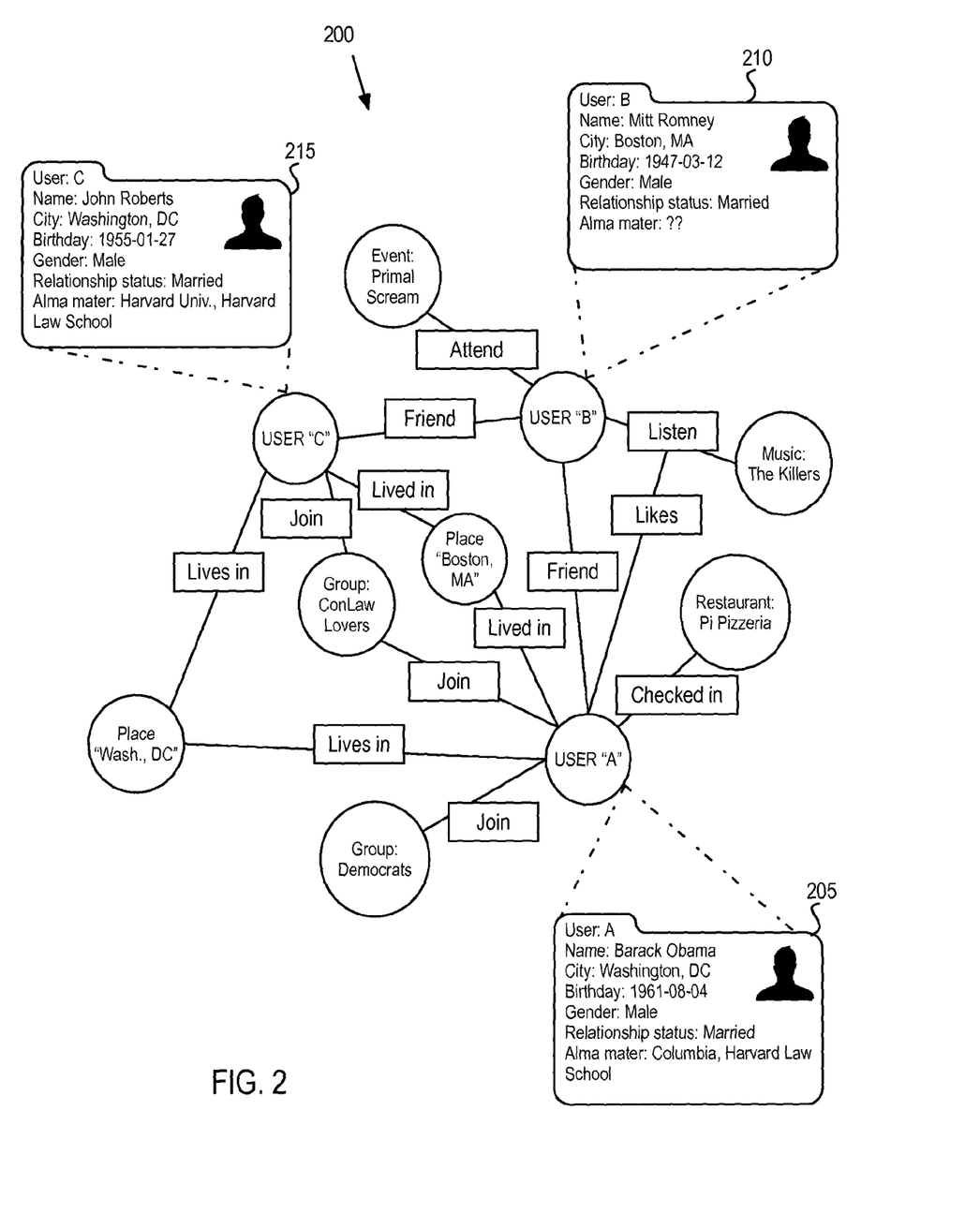
FIG. 2 illustrates an exemplary graph of social network data used to track the influence of gift giving events within a social network.

FIG. 2 illustrates exemplary graph 200 of social network data. In graph 200, objects are illustrated as circles and actions are illustrated as labeled connections between circles. Developers of the social network or corresponding social network applications define actions to represent different ways that users may interact with the social network and/or their applications. As users perform actions, connections are made between users and objects. For example, User A has performed a number of actions within the social network, indicating that he previously lived in Boston, currently lives in Washington D.C., joined groups for Democrats and ConLaw Lovers, checked in at Pi Pizzeria in St. Louis, Mo., and is friends with User B. User B and User C have also performed a number of actions with respect to objects within graph 200.

In one embodiment, users are able to add demographic information to user profiles 205-215. In one embodiment, for demographic information that has not been entered by a user, a social network application generates an estimate based upon the user's actions, connections, and/or actions of connections. For example, User B has not entered an alma mater into user profile 210. A social network application may determine from User B's contacts, activities, cities of residence, etc. that User B's likely alma mater is one or both of Brigham Young University and Harvard University. In one embodiment, the user profiles 205-210 include additional information, such as relationships to other users, places where the user has worked, user interests, etc.

In one embodiment, users are able to provide feedback on actions of other users/entities. As a result, actions are also viewed as objects that may be acted upon. For example, User B listened to music by the artist, The Killers. As a result, the social networking system publishes a narrative associated with User B (e.g., in a newsfeed, profile of User B, etc.) indicating that User B listened to music by the artist, The Killers. In viewing a newsfeed, profile of User B, or another form of social networking system publication(s), the social networking system displays the narrative to User A. The social networking system then receives input from User A indicating that User A "likes" that User B listened to The Killers.

In one embodiment, demographic data further includes a weight or score indicating an affinity between a user and an object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity than if two users are friends. Additionally, temporal and geographic proximity of actions/users are other exemplary indicators of affinity.

In one embodiment, the influence tracking module 129 utilizes user characteristics stored in the graph 200 to identify gifts given by users meeting received gift giving event characteristics. In one embodiment, users may select privacy settings to control what network service data is shared, with whom the data is shared, and/or what data used for identifying gift giving events and/or determining influence.

Figure 3:
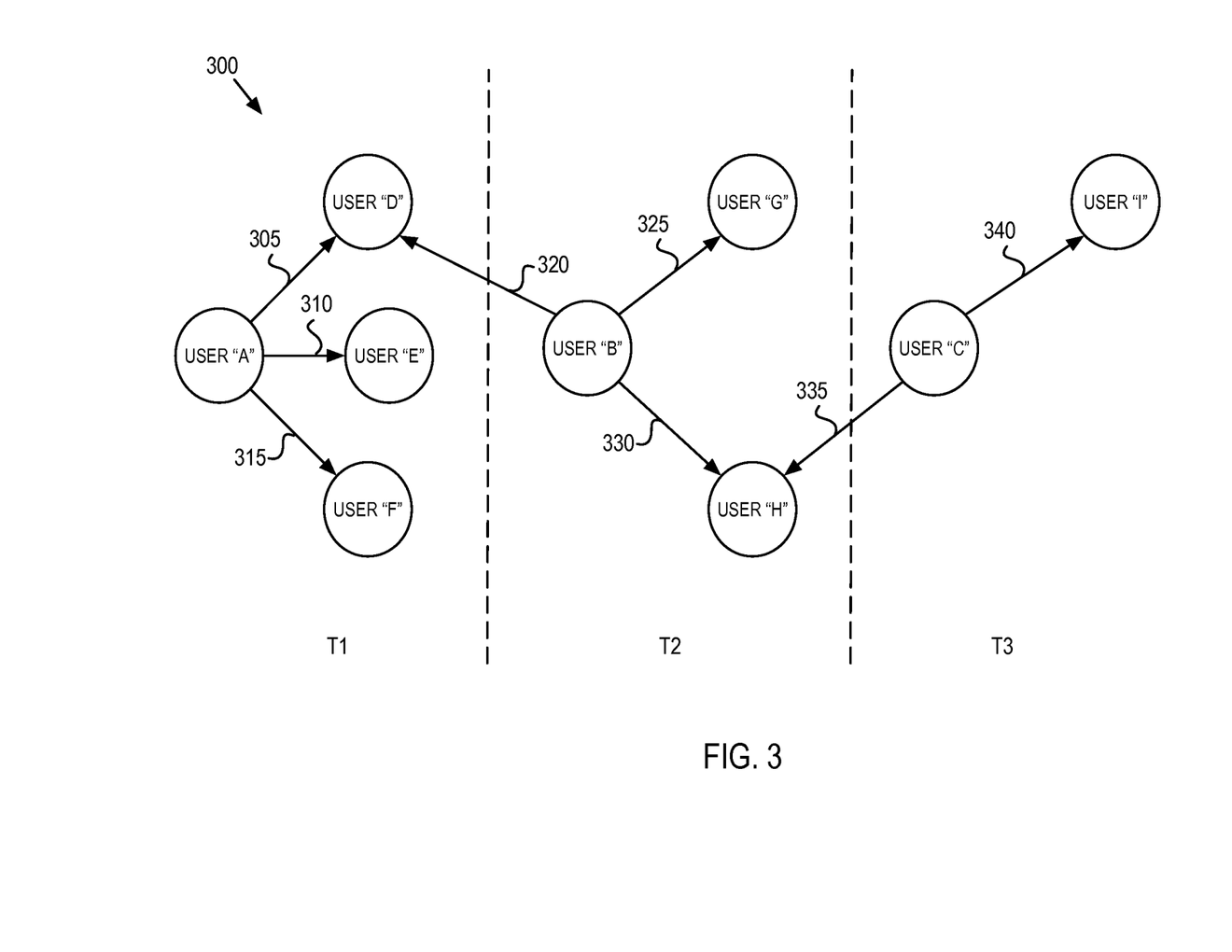
FIG. 3 illustrates another exemplary graph of social network data used to track the influence of gift giving within a social network.

FIG. 3 illustrates another exemplary graph 300 of social network data used to track the influence of gift giving within a social network. In graph 300, users are illustrated as circles and actions between the users are illustrated as directed connections between circles. For example, the circles may represent users that give or receive a gift and the directed connections represent gift data. Directed connections are made between users as representations of the actions performed by users. For example, User A gave gifts 305-315 to User D, User E, and User F, respectively. Similarly, User B gave gifts 320-330 to User D, User G, and User H, respectively, and User C gave gifts 335-340 to User H and User I, respectively. While illustrated as a directed graph, other data structures may be used to represent user actions and track influence. Additionally, while examples are described herein with reference to gift giving events, the embodiments are not so limited and may be implemented based upon other user actions. For the sake of simplicity in describing the embodiments, however, the examples will be directed to gift giving events.

In one embodiment, graph 300 is constructed in response to receiving one or more characteristics of the action(s) or user(s) involved in the action(s). For example, the influence tracking module 129 searches action log 148 and identifies gift giving events that meet a received set of one or more characteristic(s). Exemplary characteristics include characteristics of the user giving the gift or receiving the gift and characteristics of the gift itself. User characteristics include age, gender, education, school affiliation, occupation, geographic location, estimated income, interests and interactions with objects within the social network, etc. Gift characteristics include gift value, gift quantity, a brand or business associated with the gift, specific gift items, etc. As described above, these characteristics may be stored in one or more of the data stores 101. In one embodiment, a user's purchase history is included as a potential user characteristic. For example, the user may have made a purchase of a good or service through the social network or using the social network to automatically fill a form to complete a transaction. As another example, a vendor may share the purchase data with the social network.

Additionally, the influence tracking module 129 identifies gift giving events within particular time periods. In one embodiment, the time period is set to a default value. Alternatively, a time period is received in addition to or instead of gift giving characteristics. For example, graph 300 may represent gift giving events in which each gift 305-315 within time period T1 has been identified as having a predetermined value or as being initiated by user that gave a gift to three users.

As a result of each of User A's gifts given, a narrative is published to the social network, e.g., indicating that User A gave gift 305 to User D, gift 310 to User E, and gift 315 to User F. These published narratives are viewable by one or more users. For example, the published narratives may be included as posts in a news feed or other publication format for User B to read upon accessing the social network. As an indication of the viral nature or other potential influence of User A's gift giving, graph 300 further includes gift giving events in a subsequent period of time, T2, in which users that were able to view the published narrative(s) of User A giving one or more of gifts 305-315 initiated one or more gift giving events of their own. For example, in time period T2, User B was able to view the published narrative(s) of User A's gift giving events and User B gave gifts 320-330 to User D, User G, and User H, respectively. Given that a representation of User D was already included in time period T1, the gift giving event in which User B gave gift 320 to User D is illustrated with a directed connection going back from time period T2, when the gift giving event was initiated, to the representation of User D. In one embodiment, time period T1 and time period T2 are equal in amount of time. Additionally, while the use of "able to view" and like is used herein, other embodiments include users actually viewing (e.g., as determined by an amount of time actually displayed on a user device) the published narrative(s).

Similar to the description above, as a result of each of User B's gifts given, a narrative is published to the social network. In one embodiment, as a further indication of the viral nature or other potential influence of User A's gift giving, graph 300 further includes gift giving events in a subsequent period of time, T3, in which users viewed or were able to view the published narrative(s) of User B giving one or more of gifts 320-330 initiated one or more gift giving events of their own. For example, in time period T3, User C was able to view the published narrative(s) of User B's gift giving events and User C gave gifts 335-340 to User H and User I, respectively.

In one embodiment, the influence tracking module 129 continues adding gift giving events from subsequent time periods in similar manner until no additional gift giving events are identified as being initiated by a user that viewed or was able to view a gift giving event identified in a previous time period. For example, if no users that were able to view the published narrative(s) of User C giving gift 335 to User H or gift 340 to User I gave a gift in the time period subsequent to time period T3, graph 300 would stop searching for additional gift giving events that may represent the influence or viral nature of User A giving gifts.

Figure 4:
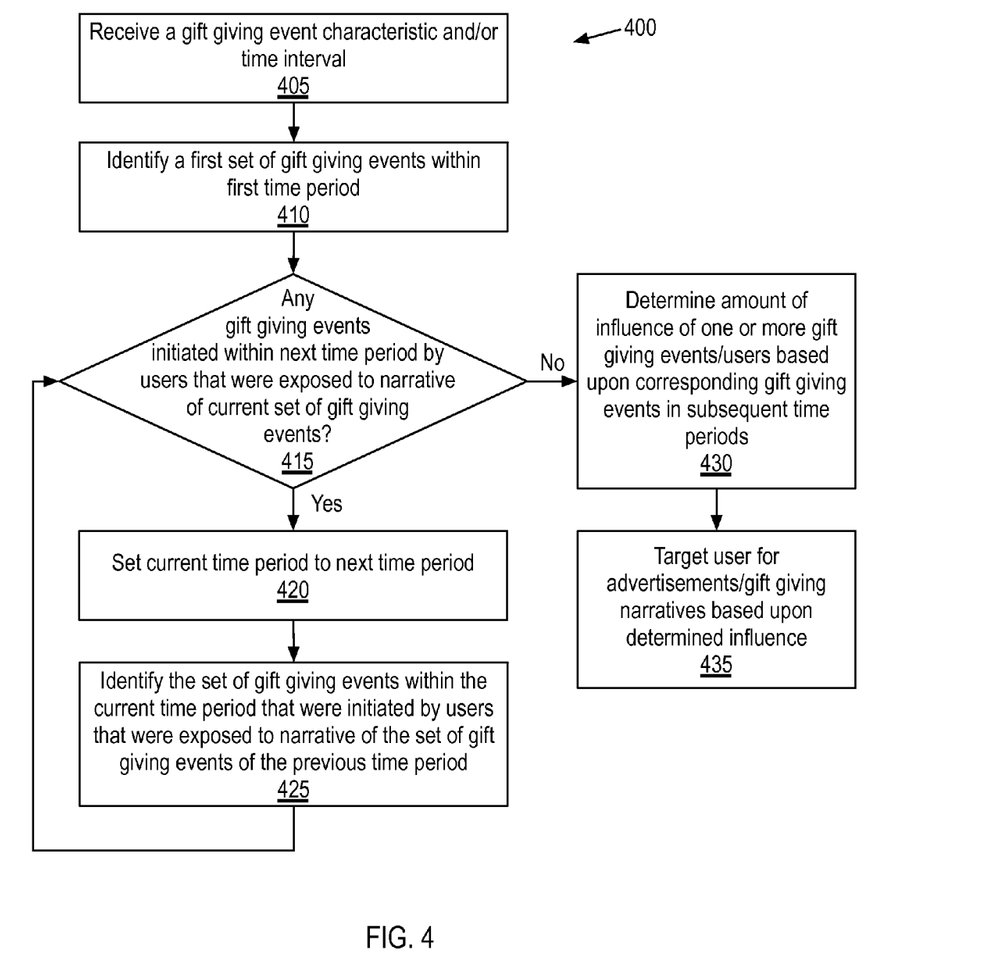
FIG. 4 is a flow chart illustrating an exemplary method of tracking the influence of gift giving within a social network.

FIG. 4 is a flow chart illustrating an exemplary method 400 of tracking the influence of gift giving within a social network. At block 405, the influence tracking module 129 receives a gift giving event characteristic and/or a time interval. At block 410, the influence tracking module 129 identifies a first set of gift giving events that meet the received gift giving event characteristic and/or occur within the received time interval. For example, if the received gift giving characteristics include users within a particular age group and geographic region, the influence tracking module 129 identifies users that gave gifts within a first period of time that are within the age group and geographic region. In one embodiment, the influence tracking module 129 searches the social graph store 140, the action log 148, object data store 154, and/or user profile data store 152 to identify users that meet these characteristics.

At block 415, the influence tracking module 129 determines if any gift giving events were initiated in a subsequent time period by users that were able to view a published narrative of a gift giving event of the current set of gift giving events. For example, as described with reference to FIG. 3, User B was able to view the published narrative(s) of User A's gift giving events and User B gave gifts 320-330 to User D, User G, and User H, respectively, in time period T2.

At block 420, if additional gift giving events were initiated within the subsequent time period, the influence tracking module 129 treats the subsequent time period as the current time period. For example, as described with reference to FIG. 3, User C was able to view the published narrative(s) of User B's gift giving events and gave gifts 335-340 to User H and User I, respectively. As a result, the influence tracking module 129 advances the current time period from time period T1 to time period T2. At block 425, the influence tracking module 129 identifies the set of one or more additional gift giving events in the current time period and method 400 returns to block 415 to determine if there are any additional sets of gift giving events to identify in subsequent time periods.

When the influence tracking module 129 determines that no additional gift giving events were initiated in a subsequent time period by users that were able to view a published narrative of a gift giving event of the current set of gift giving events, at block 430, the influence tracking module 129 determines the amount of influence of one or more of the gift giving events or users based upon corresponding gift giving events in subsequent time periods. For example, the influence tracking module 129 may select a first user that initiated a gift giving event in the first time period. Alternatively, the influence tracking module 129 may select a first user that initiated a gift giving event in a subsequent time period.

In one embodiment, determining an amount of influence of the first user includes summing, averaging, or otherwise utilizing the value of gifts given by one or more identified users in the chain of gift giving events originating with the first user. For example, the amount of influence may include a value of gifts given by a second user in the second period time, the second user being within the group of one or more users that were able to view a published narrative of the first user's gift giving event. As another example, referring to graph 300 in FIG. 3, the determined amount of influence of User A may include summing, averaging, or otherwise utilizing the value of gifts given by User B and User C.

In another embodiment, determining an amount of influence of the first user includes summing, averaging, or otherwise utilizing the number of gifts given by one or more identified users in the chain of gift giving events originating with the first user. For example, the amount of influence may include a number of gifts given by a second user in the second period time, the second user being within the group of one or more users that were able to view a published narrative of the first user's gift giving event. As another example, referring to graph 300 in FIG. 3, the determined amount of influence of User A may include summing, averaging, or otherwise utilizing the number of gifts given by User B and User C.

In yet another embodiment, determining an amount of influence of the first user includes summing, averaging, or otherwise utilizing the number of users giving gifts in the chain of gift giving events originating with the first user. For example, the amount of influence may include a number of users identified as giving a gift in the second period time, the user(s) being within the group of one or more users that were able to view a published narrative of the first user's gift giving event. As another example, referring to graph 300 in FIG. 3, the determined amount of influence of User A may include summing the number users that initiated gift giving events in subsequent to User A's gift giving event. In such an example, User B and User C are summed to a total of two.

At block 435, a user is optionally targeted for an advertisement or published post including a gift giving narrative based upon the determined influence. For example, if it is determined that the amount of influence for the first user is at or above a threshold value, the user is targeted. In one embodiment, the targeting includes the social networking system displaying or prioritizing the display of an advertisement. In one embodiment, the advertisement is related to a previous gift given by the user. In one embodiment, the advertisement includes a user interface object to enable or encourage the user to give another gift. In yet another embodiment, the targeting includes the social networking system displaying or prioritizing the display of published narrative of a gift giving event. For example, the social networking system may selectively present published narratives of a gift giving events to users with a threshold level of influence or identified as being a part of a viral gifting chain in an influence graph. In one embodiment, users are targeted based upon a larger group characteristic associated with a likelihood of giving gifts or having a threshold level of influence. For example, if users of a particular demographic category or other identifying characteristic collectively have a threshold level of influence, those users collectively are targeted. In yet another embodiment, the targeting includes presenting the user with a recommendation to purchase a gift for another user. For example, if the first user has a threshold level of influence, is friends within the social network with a second user, and the social network determines that the second user has an event approaching that is associated with gifts (such as a birthday), the social networking system may present the first user with a recommendation to buy the second user a gift for the event.

Figure 5:
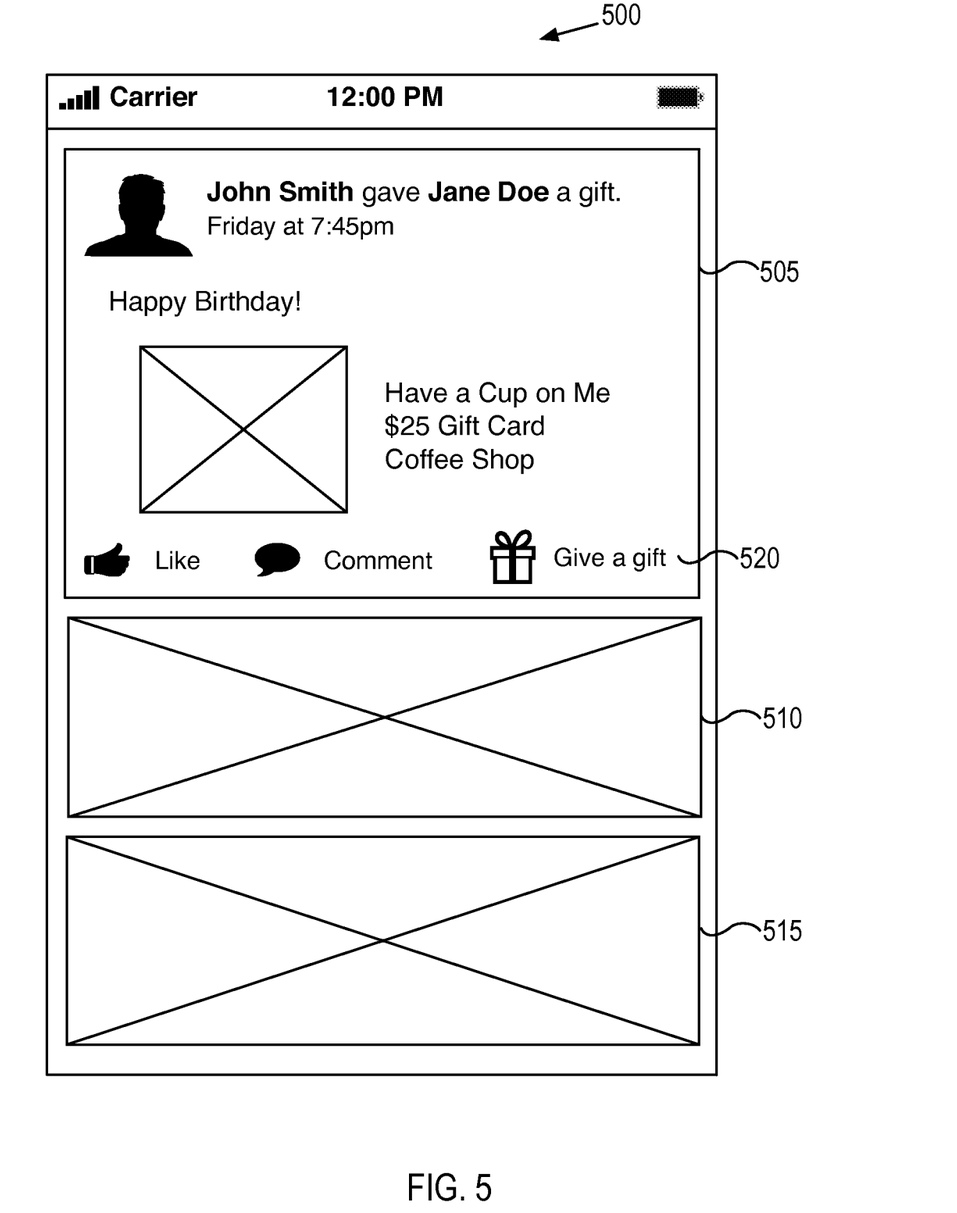
FIG. 5 is an exemplary user interface including a published narrative of an identified gift giving event or of a gift giving event displayed in response to determined influence of gift giving within a social network.

FIG. 5 is an exemplary user interface 500 including a published narrative 505 of a gift giving event. For example, the published narrative 505 may be published in a news feed or other publication format including other published posts 510-515. The published narrative 505 includes a description and/or image of the gift given as well as an indication of the users giving and receiving the gift.

In one embodiment, the published narrative 505 is an example of an identified gift giving event used in determining the influence of a user giving one or more gifts. For example, the user, John Smith, or the gift, a $25 Gift Card given to Jane Doe, may be identified as meeting a gift giving characteristic.

In one embodiment, the published narrative 505 is an example of a gift giving event displayed in response to determined influence of gift giving within a social network. For example, a user viewing a news feed may be presented with the published narrative generally, or in a particular location in or near their news feed, in response to determining that the viewing user has a threshold level of influence.

The published narrative 505 also includes a user interface object 520 to encourage a viewing user to give a gift. For example, the user interface object 520 may serve to encourage the viewing user to give a gift from the business from which the gift in the published narrative 505 is sold, to give a gift to the recipient of the gift in the published narrative 505, or to give a gift in general. In alternative embodiment, the user interface object 520 is presented to the user in a different location than within the published narrative 505.

Figure 6:
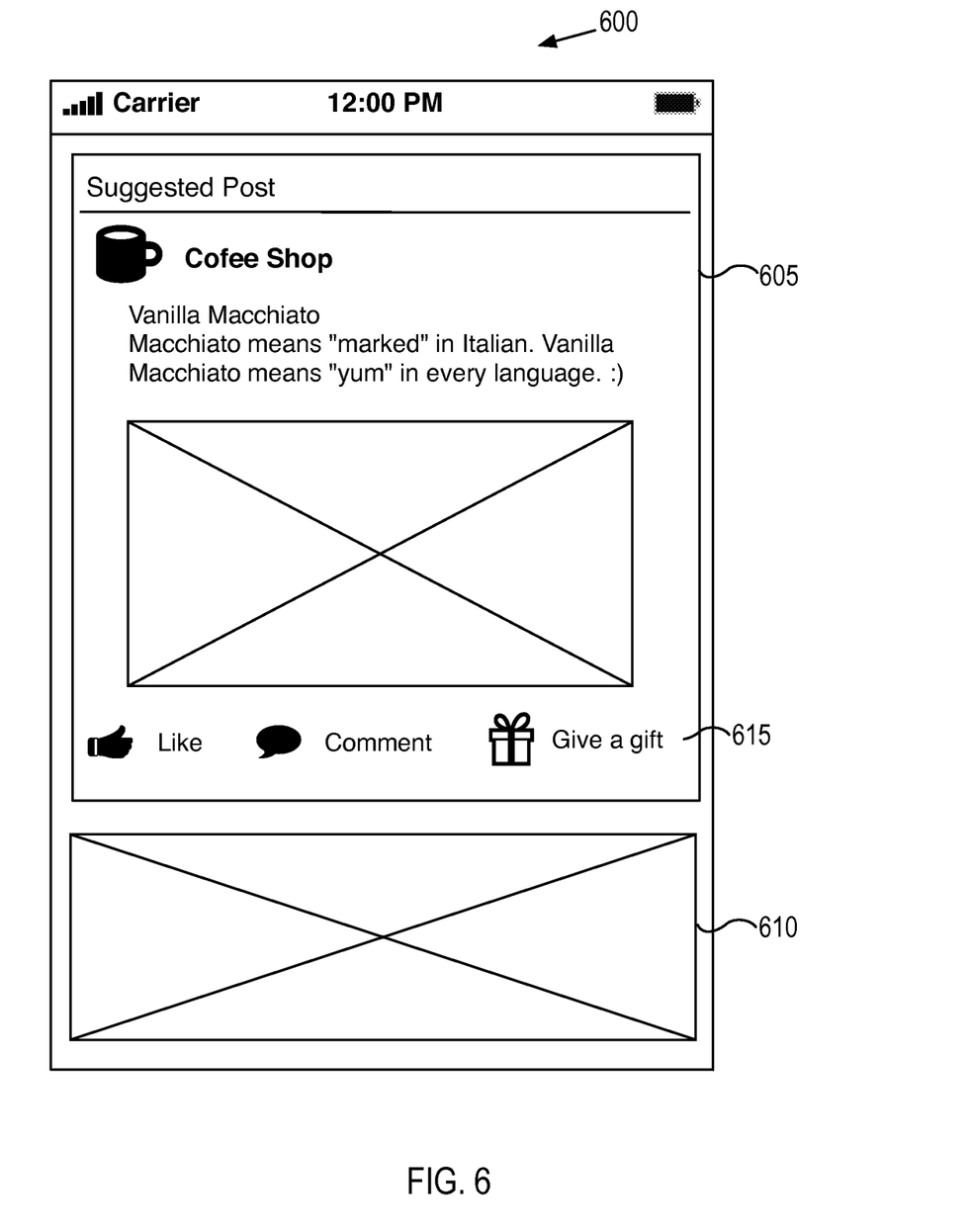
FIG. 6 is an exemplary user interface including an advertisement displayed in response to determined influence of gift giving within a social network.

FIG. 6 is an exemplary user interface 600 including an advertisement 605 displayed in response to determined influence of gift giving within a social network. For example, the advertisement 605 may be published in a news feed or other publication format including one or more other published posts 610. The advertisement 605 includes an identification of a vendor or other business entity associated with the advertisement and text and/or an image to promote the advertised product or service. Similar to the published narrative described above, the advertisement 605 includes a user interface object 615 to encourage a viewing user to give a gift. For example, the user interface object 615 may serve to encourage the viewing user to give the advertised product or service as a gift.

Figure 7:
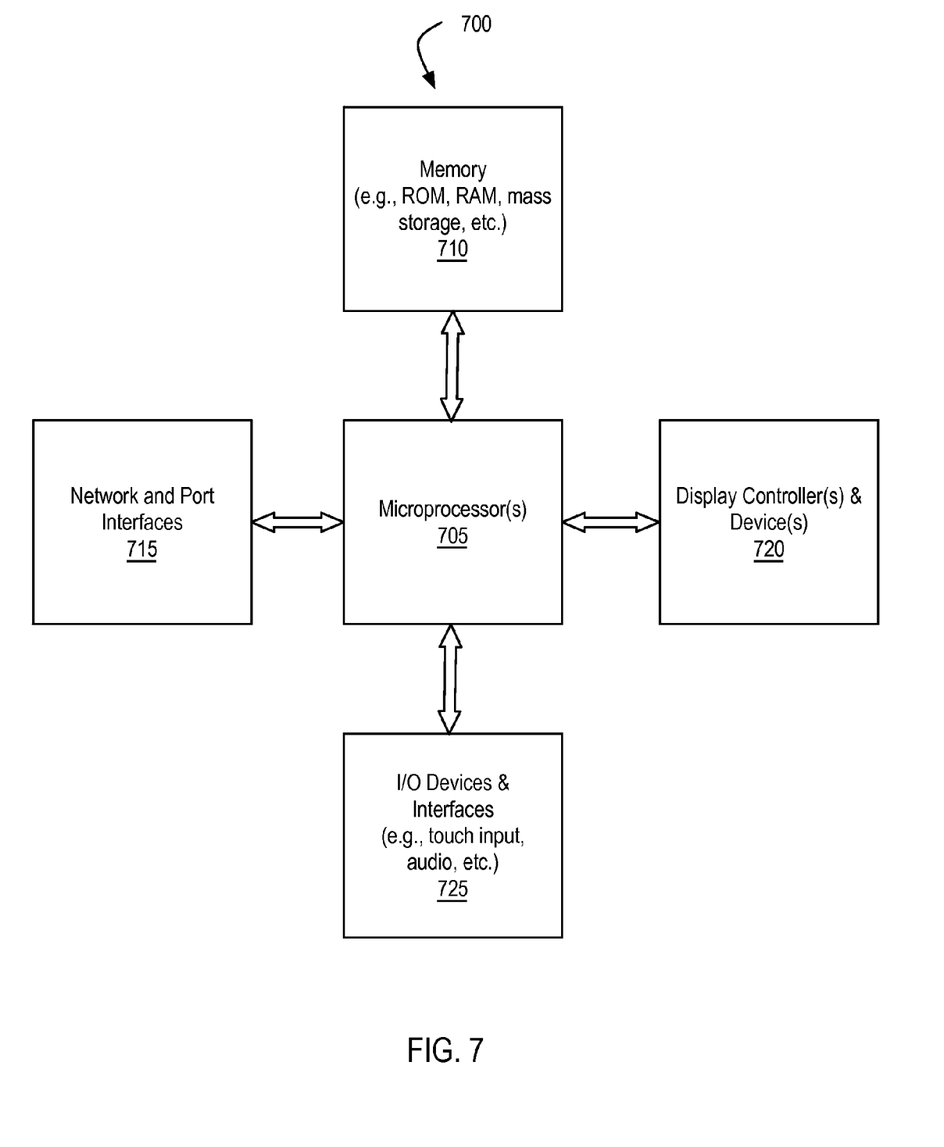
FIG. 7 illustrates, in block diagram form, an exemplary processing system to track the influence of gift giving events within a social network.

FIG. 7 illustrates, in block diagram form, an exemplary processing system 700 to track the influence of gift giving events within a social network. In some embodiments, this is a high-level view of social networking system 130 described herein. Data processing system 700 includes one or more microprocessors 705 and connected system components (e.g., multiple connected chips). Alternatively, data processing system 700 is a system on a chip.

Data processing system 700 includes memory 710, which is coupled to microprocessor(s) 705. Memory 710 may be used for storing data, metadata, and programs for execution by the microprocessor(s) 705. For example, memory 710 may include one or more of the data stores 101 and/or may store modules described herein. Memory 710 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 710 may be internal or distributed memory.

Data processing system 700 includes network and port interfaces 715, such as a port, connector for a dock, or a connector for a USB interface, FireWire, Thunderbolt, Ethernet, Fibre Channel, etc. to connect the system 700 with another device, external component, or a network. Exemplary network and port interfaces 715 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 700 with another device, external component, or a network and receive stored instructions, data, tokens, etc.

Data processing system 700 also includes display controller and display device 720 and one or more input or output ("I/O") devices and interfaces 725. Display controller and display device 720 provides a visual user interface for the user. I/O devices 725 allow a user to provide input to, receive output from, and otherwise transfer data to and from the system. I/O devices 725 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 7.

Data processing system 700 is an exemplary representation of one or more of the user device 104, external server 115, and one or more components of social networking system 130, or modules thereof (e.g., influence tracking module 129), described above described above. Data processing system 700 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 700 may be a network computer, server, or an embedded processing device within another device or consumer electronic product. As used herein, the terms computer, device, system, processing system, processing device, and "apparatus comprising a processing device" may be used interchangeably with data processing system 700 and include the above-listed exemplary embodiments.

Additional components, not shown, may also be part of data processing system 700, and, in certain embodiments, fewer components than that shown in FIG. 7 may also be used in data processing system 700. It will be apparent from this description that aspects of the inventions may be embodied, at least in part, in software. That is, the computer-implemented method 400 may be carried out in a computer system or other data processing system 700 in response to its processor or processing system 705 executing sequences of instructions contained in a memory, such as memory 710 or other non-transitory machine-readable storage medium. The software may further be transmitted or received over a network (not shown) via network interface device 715. In various embodiments, hardwired circuitry may be used in combination with the software instructions to implement the present embodiments. Thus, the techniques are not limited to any specific combination of hardware circuitry and software, or to any particular source for the instructions executed by data processing system 700.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

As detailed herein, some embodiments of a method; embodiments of a non-transitory computer-readable medium storing instructions which, when executed by one or more processors in a processing device, cause the processing device to perform a method; and embodiments of an apparatus comprising a processing device, wherein the processing device executes instructions that cause the apparatus to perform a method. The methods described herein include receiving a gift giving event characteristic; identifying a first set of one or more gift giving events within a first period of time that meet the received gift giving event characteristic, each of the gift giving events resulting in a narrative being published to a social network and viewable by a group of one or more users of the social network; identifying a second set of one or more gift giving events within a second period of time, the second period of time being subsequent to the first period time, the second set of gift giving events being initiated by the group of one or more users; and determining an amount of influence of a first user that initiated a gift giving event from the first set of gift giving events based upon the second set of gift giving events. Additionally, some embodiments of the method further include one or more of: 1) selecting an advertisement to be displayed to the first user that initiated the gift giving event based upon the determined amount of influence; 2) selecting a gift giving narrative to be displayed to the first user that initiated the gift giving event based upon the determined amount of influence; 3) the amount of influence including a value of gifts given by a second user in the second period time, wherein the second user is within the group of one or more users, and wherein the narrative of the gift giving event initiated by the first user is viewable by the second user; 4) the amount of influence including a number of gifts given by a second user in the second period time, wherein the second user is within the group of one or more users, and wherein the narrative of the gift giving event initiated by the first user is viewable by the second user; 5) the amount of influence including a number of users that initiated gift giving events in the second period time and to which the narrative of the gift giving event initiated by the first user is viewable; 6) determining that the group of one or more users viewed published narratives of the first set of one or more gift giving events; 7) the gift giving event characteristic describing a category of users giving gifts within the first period of time; and/or 8) the gift giving event characteristic describing a type or number of gifts given by each user within the first period of time.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
publishing narratives of gift giving events to a communication system viewable by users of the communication system on user devices;
receiving a gift giving event characteristic;
identifying, from the published narratives of gift giving events, a first set of one or more gift giving events within a first period of time that meet the received gift giving event characteristic;
identifying a second set of one or more gift giving events within a second period of time, the second period of time being subsequent to the first period time, the second set of gift giving events being initiated by a group of one or more users able to view a published narrative of a gift giving event that was initiated by a first user and that was within the first set of gift giving events, the published narrative of the gift giving event associated with a user profile of the first user, the group of one or more users being able to view the published narrative based on connections between user profiles of the group of one or more users with the first user profile stored within the communication system;
determining an amount of influence of the first user using the second set of gift giving events initiated by the group of one or more users that were able to view a published narrative of a gift giving event that was initiated by the first user and that was within the first set of gift giving events; and
transmitting, to a user device associated with the first user that initiated the gift giving event, an advertisement or gift giving narrative to be displayed to the first user in response to the determined amount of influence being at or above a threshold value.

2. The computer-implemented method of claim 1, wherein the amount of influence includes a value of gifts given by a second user in the second period time, wherein the second user is within the group of one or more users, and wherein the narrative of the gift giving event initiated by the first user is viewable by the second user.

3. The computer-implemented method of claim 1, wherein the amount of influence includes a number of gifts given by a second user in the second period time, wherein the second user is within the group of one or more users, and wherein the narrative of the gift giving event initiated by the first user is viewable by the second user.

4. The computer-implemented method of claim 1, wherein the amount of influence includes a number of users that initiated gift giving events in the second period time and to which the narrative of the gift giving event initiated by the first user is viewable.

5. The computer-implemented method of claim 1, further comprising:
determining that the group of one or more users viewed published narratives of the first set of one or more gift giving events.

6. The computer-implemented method of claim 1, wherein the gift giving event characteristic describes a category of users giving gifts within the first period of time.

7. The computer-implemented method of claim 1, wherein the gift giving event characteristic describes a type or number of gifts given by each user within the first period of time.

8. A non-transitory computer-readable medium storing instructions which, when executed by one or more processors in a processing device, cause the processing device to perform a method comprising:
publishing narratives of gift giving events to a communication system viewable by users of the communication system on user devices;
receiving a gift giving event characteristic;
identifying, from the published narratives of gift (living events, a first set of one or more gift giving events within a first period of time that meet the received gift giving event characteristic;
identifying a second set of one or more gift giving events within a second period of time, the second period of time being subsequent to the first period time, the second set of gift giving events being initiated by a group of one or more users able to view a published narrative of a gift giving event that was initiated by a first user and that was within the first set of gift giving events, the published narrative of the gift (living event associated with a user profile of the first user, the group of one or more users being able to view the published narrative based on connections between user profiles of the group of one or more users with the first user profile stored within the communication system;
determining an amount of influence of the first user using the second set of gift giving events initiated by the group of one or more users that were able to view a published narrative of a gift giving event that was initiated by the first user and that was within the first set of gift giving events; and transmitting, to a user device associated with the first user that initiated the gift giving event, an advertisement or gift giving narrative to be displayed to the first user in response to the determined amount of influence being at or above a threshold value.

9. The non-transitory computer-readable medium of claim 8, wherein the amount of influence includes a value of gifts given by a second user in the second period time, wherein the second user is within the group of one or more users, and wherein the narrative of the gift giving event initiated by the first user is viewable by the second user.

10. The non-transitory computer-readable medium of claim 8, wherein the amount of influence includes a number of gifts given by a second user in the second period time, wherein the second user is within the group of one or more users, and wherein the narrative of the gift giving event initiated by the first user is viewable by the second user.

11. The non-transitory computer-readable medium of claim 8, wherein the amount of influence includes a number of users that initiated gift giving events in the second period time and to which the narrative of the gift giving event initiated by the first user is viewable.

12. The non-transitory computer-readable medium of claim 8, the method further comprising:
determining that the group of one or more users viewed published narratives of the first set of one or more gift giving events.

13. The non-transitory computer-readable medium of claim 8, wherein the gift giving event characteristic describes a category of users giving gifts within the first period of time.

14. The non-transitory computer-readable medium of claim 8, wherein the gift giving event characteristic describes a type or number of gifts given by each user within the first period of time.

15. An apparatus comprising:
a processing device; and
a memory coupled to the processing device, the memory storing instructions which, when executed by the processing device, cause the apparatus to:
publish narratives of (lift (living events to a communication system viewable by users of the communication system on user devices;
receive a gift giving event characteristic;
identify, from the published narratives of (lift (living events, a first set of one or more gift giving events within a first period of time that meet the received gift giving event characteristic;
identify a second set of one or more gift giving events within a second period of time, the second period of time being subsequent to the first period time, the second set of gift giving events being initiated by a group of one or more users able to view a published narrative of a gift giving event that was initiated by a first user and that was within the first set of gift giving events, the published narrative of the gift giving event associated with a user profile of the first user, the group of one or more users being able to view the published narrative based on connections between user profiles of the group of one or more users with the first user profile stored within the communication system;
determine an amount of influence of the first user using the second set of gift giving events initiated by the group of one or more users that were able to view a published narrative of a gift giving event that was initiated by the first user and that was within the first set of gift giving events; and
transmit, to a user device associated with the first user that initiated the gift giving event, an advertisement or gift giving narrative to be displayed to the first user in response to the determined amount of influence being at or above a threshold value.

16. The apparatus of claim 15, wherein the amount of influence includes a value of gifts given by a second user in the second period time, wherein the second user is within the group of one or more users, and wherein the narrative of the gift giving event initiated by the first user is viewable by the second user.

17. The apparatus of claim 15, wherein the amount of influence includes a number of gifts given by a second user in the second period time, wherein the second user is within the group of one or more users, and wherein the narrative of the gift giving event initiated by the first user is viewable by the second user.

18. The apparatus of claim 15, wherein the amount of influence includes a number of users that initiated gift giving events in the second period time and to which the narrative of the gift giving event initiated by the first user is viewable.

19. The apparatus of claim 15, wherein the execution of the instructions further cause the apparatus to:
determine that the group of one or more users viewed published narratives of the first set of one or more gift giving events.

20. The apparatus of claim 15, wherein the gift giving event characteristic describes a category of users giving gifts within the first period of time.

* * * * *